(12) United States Patent
Wama et al.

(10) Patent No.: US 10,279,726 B2
(45) Date of Patent: May 7, 2019

(54) VEHICULAR LAMP

(71) Applicant: Koito Manufacturing Co., Ltd., Tokyo (JP)

(72) Inventors: Takenori Wama, Shizuoka (JP); Mitsuharu Mano, Shizuoka (JP); Takanori Namba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/843,134

(22) Filed: Dec. 15, 2017

(65) Prior Publication Data

US 2018/0170240 A1 Jun. 21, 2018

(30) Foreign Application Priority Data

Dec. 19, 2016 (JP) ................................. 2016-245369

(51) Int. Cl.
| | | |
|---|---|---|
| *B60Q 1/00* | (2006.01) | |
| *B60Q 1/08* | (2006.01) | |
| *B60Q 1/14* | (2006.01) | |
| *F21S 43/14* | (2018.01) | |
| *F21S 43/31* | (2018.01) | |

(52) U.S. Cl.
CPC ......... *B60Q 1/0023* (2013.01); *B60Q 1/0041* (2013.01); *B60Q 1/0047* (2013.01); *B60Q 1/08* (2013.01); *B60Q 1/143* (2013.01); *F21S 43/14* (2018.01); *F21S 43/31* (2018.01); *B60Q 2200/38* (2013.01)

(58) Field of Classification Search
CPC ..... F21S 48/1208; F21V 17/107; F21V 17/00
USPC .................................................. 362/375, 466
See application file for complete search history.

(56) References Cited

U.S. PATENT DOCUMENTS

| | | | |
|---|---|---|---|
| 9,956,902 B2 * | 5/2018 | Fukayama ............. | B60Q 1/143 |
| 2013/0039080 A1 * | 2/2013 | Yamazaki .............. | B60Q 1/085 362/465 |
| 2013/0076240 A1 * | 3/2013 | Endo ..................... | B60Q 1/0023 315/82 |
| 2016/0185276 A1 * | 6/2016 | Tanaka ................... | B60Q 1/085 362/466 |
| 2017/0217369 A1 * | 8/2017 | Endo ......................... | B60R 1/00 |
| 2018/0105101 A1 * | 4/2018 | Tatara .................... | B60Q 1/525 |

FOREIGN PATENT DOCUMENTS

| | | |
|---|---|---|
| JP | 2011-162080 A | 8/2011 |
| JP | 2013-147138 A | 8/2013 |
| JP | 2013-164913 A | 8/2013 |

\* cited by examiner

*Primary Examiner* — Ahshik Kim
(74) *Attorney, Agent, or Firm* — Abelman, Frayne & Schwab

(57) ABSTRACT

Provided is a vehicular lamp including a main lamp unit, a sub lamp unit, and an imaging unit disposed in a lamp housing and configured to perform a light distribution control of the main lamp unit based on an image captured by the imaging unit. The sub lamp unit is disposed between the imaging unit and the main lamp unit. Light emitted from the main lamp unit is shaded by the sub lamp unit and suppressed from being incident on the imaging unit.

15 Claims, 8 Drawing Sheets

VEHICULAR LAMP

CROSS-REFERENCE TO RELATED APPLICATIONS

This application is based on and claims priority from Japanese Patent Application No. 2016-245369 filed on Dec. 19, 2016 with the Japan Patent Office, the disclosure of which is incorporated herein in its entirety by reference.

TECHNICAL FIELD

The present disclosure relates to a vehicular lamp, particularly, a vehicular lamp in which an imaging device is disposed in a lamp housing.

BACKGROUND

In a vehicle such as, for example, an automobile, in order to implement an automatic driving control or an automatic light distribution control of a headlamp, it has been proposed to detect other vehicles such as, for example, oncoming vehicles and preceding vehicles existing in the front region of the automobile by providing a camera (imaging device) in the automobile, capturing an image of the front region by the camera, and analyzing the captured image. For example, an adaptive driving beam (ADB) light distribution control has been proposed as a technique for controlling a light distribution of a headlamp of an automobile. The ADB light distribution control is a technique for controlling a part of the light distribution pattern of the high beam light distribution of the headlamp so as not to dazzle other vehicles such as, for example, oncoming vehicles and preceding vehicles detected from the image captured by the camera.

In this technique, in order to implement a highly accurate ADB light distribution control, Japanese Patent Laid-Open Publication No. 2013-147138 proposes a technique in which a camera is disposed in a lamp housing of a headlamp. According to Japanese Patent Laid-Open Publication No. 2013-147138, since the optical axis of the camera comes close to the optical axis of the lamp, the direction of the other vehicle detected from the image captured by the camera, that is, the angle when viewing the other vehicle from the own vehicle coincides or substantially coincides with the angle of the light irradiated from the headlamp. Thus, the ADB light distribution control in the headlamp may be easily and highly accurately performed.

When the camera is disposed in the lamp housing as disclosed in Japanese Patent Laid-Open Publication No. 2013-147138, a part of the light emitted from the lamp unit disposed in the same lamp housing is incident on the lens barrel of the camera directly or after being reflected by the light-transmitting cover, so that white-out due to, for example, halation is likely to occur in the image captured by the camera.

SUMMARY

In order to suppress the occurrence of the white-out, Japanese Patent Laid-Open Publication Nos. 2011-162080 and 2013-164913 disclose a light shielding structure for suppressing the light emitted from the lamp unit from being incident on the lens barrel of the camera. However, when the camera is disposed at a position adjacent or close to the lamp unit, it is difficult to suppress the light emitted from the lamp unit and reflected by the light-transmitting cover from being incident on the camera. Specifically, when the camera is disposed adjacent or close to the main lamp unit that is subjected to the ADB light distribution control, the range and direction of the light emitted from the main lamp unit are changed with the ADB light distribution control. Thus, the direction of the light reflected by the light-transmitting cover may be changed, and the light shielding structure may not function effectively in some cases.

The present disclosure is to provide a vehicular lamp which suppresses light emitted from a lamp unit from being incident on a camera.

According to a first aspect of the present disclosure, there is provided a vehicular lamp including a main lamp unit, a sub lamp unit, and an imaging unit disposed in a lamp housing and configured to perform a light distribution control of the main lamp unit based on an image captured by the imaging unit. The sub lamp unit is disposed between the imaging unit and the main lamp unit.

According to a second aspect of the present disclosure, there is provided a vehicular lamp including a main lamp unit, a sub lamp unit, and an imaging unit disposed in a lamp housing and configured to perform a light distribution control of the main lamp unit based on an image captured by the imaging unit. The sub lamp unit is turned off when the main lamp unit is subjected to a light distribution control, and the imaging unit is formed integrally with the sub lamp unit.

In the second aspect, the imaging unit is provided so as to face an opening window provided in a portion of the sub lamp unit. For example, the opening window may be provided in a reflector of the sub lamp unit, and a region including the opening window may be decorated with a design. Alternatively, the imaging unit may be formed integrally with a light source of the sub lamp unit.

According to the present disclosure, most of the light emitted from the main lamp unit is shielded by the sub lamp unit and suppressed from being incident on the imaging unit. Further, according to the second aspect, since the imaging unit is integrated with the sub lamp unit, it is possible to reduce the size of the lamp and to obtain a small vehicle lamp.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

(First Exemplary Embodiment)

Figure 1:
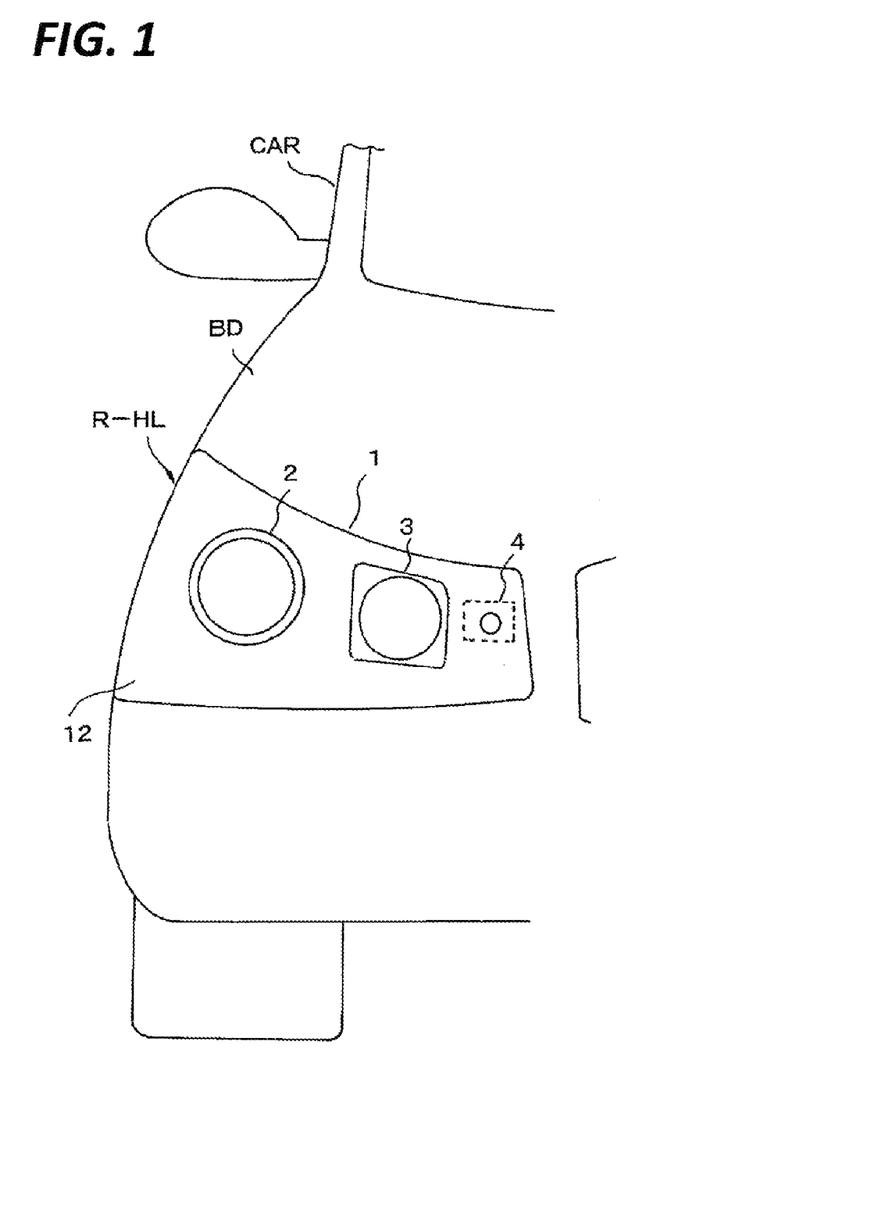
FIG. 1 is a front view of a first exemplary embodiment of an automobile to which the present disclosure is applied.

Hereinafter, an exemplary embodiment of the present disclosure will be described with reference to the drawings. FIG. 1 is a front view of a first exemplary embodiment of an automobile to which the present disclosure is applied, and a right headlamp R-HL is attached to the right front part of a body BD of an automobile CAR. Although not illustrated in FIG. 1, a left headlamp configured symmetrically with the right headlamp R-HL is attached to the left front part of the body BD.

In the right headlamp R-HL, a main lamp unit 2 and a sub lamp unit 3 are disposed in a lamp housing 1. Further, a camera 4 is disposed therein as the imaging unit according to the present disclosure. Here, the main lamp unit 2 is disposed at an outer position in the lamp housing 1 in the vehicle width direction, the sub lamp unit 3 is disposed on the inner side of the main lamp unit 2, and the camera 4 is disposed on the inner side of the sub lamp unit 3.

Figure 2:
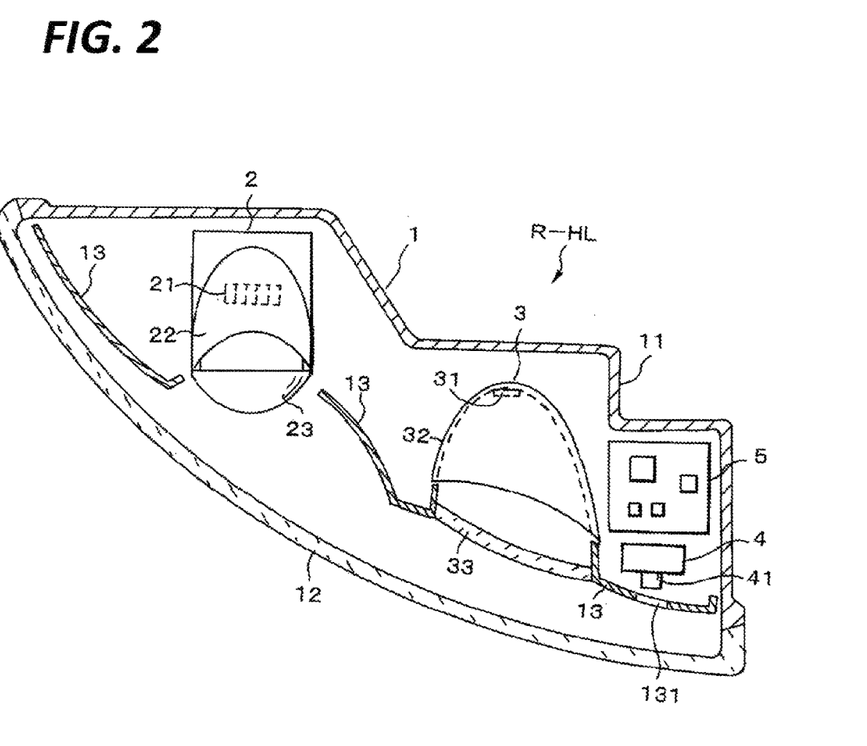
FIG. 2 is an enlarged cross-sectional view of the right headlamp of FIG. 1.

FIG. 2 is a horizontal sectional view of the right headlamp R-HL. The lamp housing 1 is constituted by a lamp body 11 formed in a container shape with a front region opened and a light-transmitting cover 12 fixed so as to cover the opening of the lamp body 11. As will be described in detail later, the light-transmitting cover 12 is formed of a transparent colorless resin in a plate shape curved into a required shape. The translucent cover 12 transmits the light emitted from the main and sub lamp units 2, 3 to irradiate the front region of the automobile. Further, the camera 4 is capable of capturing an image of the front region of the automobile through the light-transmitting cover 12.

An extension 13 is disposed in the lamp housing 1, and the inside of the lamp housing 1 is partitioned by the extension 13 into regions of a main lamp part, a sub lamp part, and a camera part in this order from the left side of FIG. 2. The extension 13 is formed as a pseudo-reflector with the surface thereof coated or plated with aluminum.

The main lamp unit 2 is configured as a projector type lamp unit that uses a plurality of white light emitting diodes (LEDs) 21 as a light source, reflects white light emitted from the white LEDs 21 with the reflector 22, and projects the reflected light onto the front of the automobile by a projection lens 23, thereby performing illumination. As described later, the light distribution of the main lamp unit may be controllably switched between a high beam light distribution and a low beam light distribution by selectively causing the plurality of white LEDs 21 to emit light. Further, it is also possible to perform a control of the ADB light distribution which selectively does not illuminate a part of the region of the light distribution pattern of the high beam light distribution in a similar manner.

The sub lamp unit 3 is configured as a clearance lamp here. The clearance lamp 3 is configured as a reflector type lamp unit that uses white LEDs 31 as a light source, reflects the white light emitted by the white LEDs 31 with the reflector 32, and illuminates the front of the automobile with a required light distribution pattern by an inner lens 33 disposed on the front side of the reflector 32.

The camera 4 is configured as a camera including a CCD imaging element or a CMOS imaging element. The camera 4 is disposed on the rear side of the extension 13 so as not to be observed from the outside when viewed through the light-transmitting cover 12 from the front of the headlamp R-HL. The lens barrel 41 of the camera 4 is disposed at a position facing the opening window 131 provided in the extension 13, and it is possible to capture an image of the front region of the automobile through the opening window 131.

Further, in the lamp housing 1, a lamp electronic control unit (ECU) 5 is disposed at a position which is not exposed to the outside by the extension 13. The lamp ECU 5 is electrically connected to each of the main lamp unit 2, the sub lamp unit 3, and the camera 4. Specifically, the lamp ECU 5 is configured to perform an ADB light distribution control on the lighting state of the main lamp unit 2 and the sub lamp unit 3 based on the image captured by the camera 4.

Figure 3:
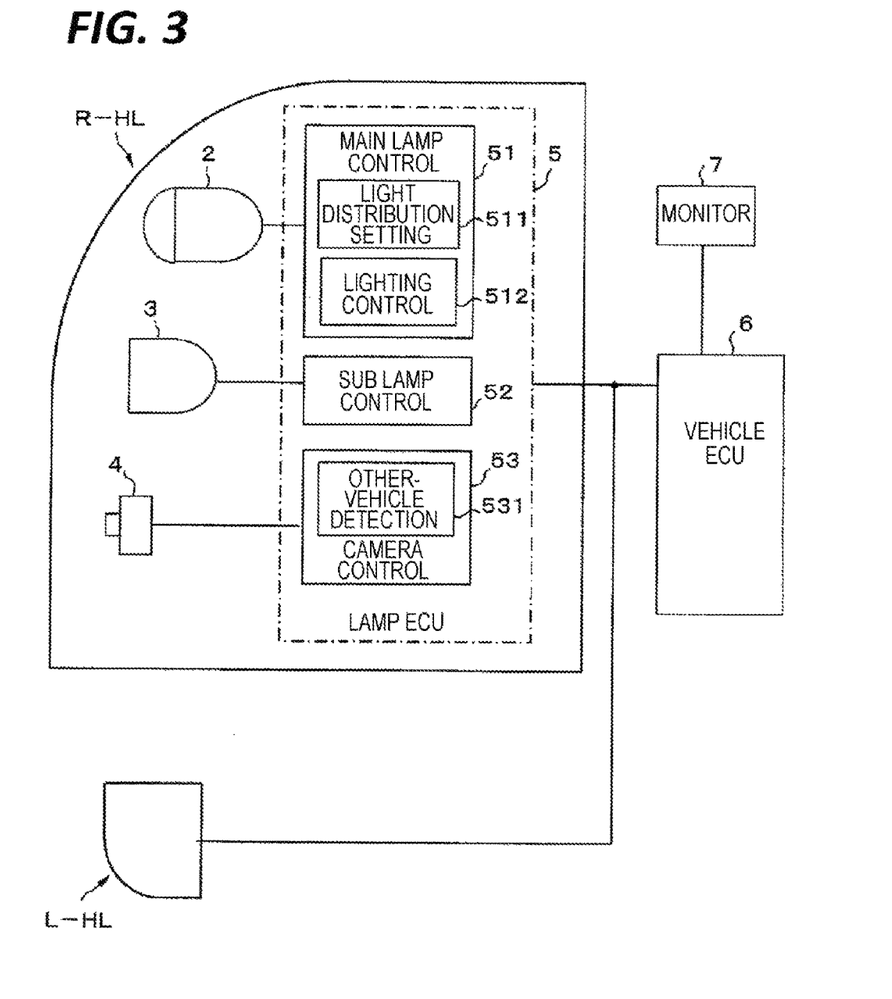
FIG. 3 is a block diagram of a lighting control device including right and left headlamps.

FIG. 3 is a block diagram of the lamp units 2, 3, the camera 4, and the lamp ECU 5. The lamp ECU 5 includes a main lamp controller 51, a sub lamp controller 52, and a camera controller 53. In addition, the lamp ECU 5 is connected to a vehicle ECU 6 provided in the automobile CAR to perform a comprehensive control related to the traveling of the automobile CAR. In addition, a monitor 7 is disposed in the passenger compartment to notify occupants of the automobile CAR of various kinds of information. The monitor 7 is connected to the vehicle ECU 6. The monitor 7 may be constituted by a display panel of a navigation device.

The lamp ECU 5 receives a control signal from the vehicle ECU 6 and performs a control of the main lamp unit 2, the sub lamp unit 3, and the camera 4. For example, the main lamp controller 51 performs an on/off control, a high beam/low beam light distribution control, and an ADB light distribution control of the main lamp unit 2. The sub lamp controller 52 controls turning on/off of the sub lamp unit 3. Further, the camera controller 53 includes an other-vehicle detection unit 531 that analyzes the image captured by the camera 4 and detects other vehicles existing in front of the automobile, that is, oncoming vehicles and preceding vehicles, 4, and performs a control related to the image capturing by the camera 4, for example, a control of the image capturing timing or a fetching operation of the captured image.

Here, the main lamp controller 51 includes a light distribution setting unit 511 that sets an appropriate light distribution corresponding to the other vehicles detected by the other-vehicle detection unit 531, and a lighting control unit 512 that controls turning on/off of the plurality of white LEDs 21 of the main lamp unit 2.

With this configuration, when the other-vehicle detection unit 531 detects an oncoming vehicle or a preceding vehicle existing in the front region of the own vehicle from the image captured by the camera, the main lamp control unit 51 causes the main light distribution setting unit 511 to set the light distribution of the main lamp unit 2 to one of the high beam light distribution, the low beam light distribution, and the ADB light distribution. The lighting control unit 512 uniformly or selectively performs a lighting control on the plurality of white LEDs 21 in order to implement the set light distribution. Therefore, the light distribution control for illuminating the front region of the own vehicle as brightly as possible is implemented without dazzling the oncoming vehicles or the preceding vehicles.

Although the detailed description is omitted, the configuration of the left headlamp L-HL of the automobile illustrated in FIG. 3 is symmetrical with the right headlamp R-HL, and a lamp ECU (not illustrated) provided in the left headlamp L-HL is also connected to the vehicle ECU 6. Therefore, in the left headlamp L-HL as well, the control of the high beam distribution, the low beam distribution, and the ADB light distribution in the main lamp unit is independently performed.

According to the above configuration, when a lamp switch (not illustrated) is turned on, the main lamp controller 51 and the sub lamp controller 52 of the lamp ECU 5 control the lighting of the main lamp unit 2 and the sub lamp unit 3, respectively. The main lamp controller 51 performs the high beam light distribution control, the low beam light distribution control, and the ADB light distribution control based on a signal from the vehicle ECU 6.

Figure 4:
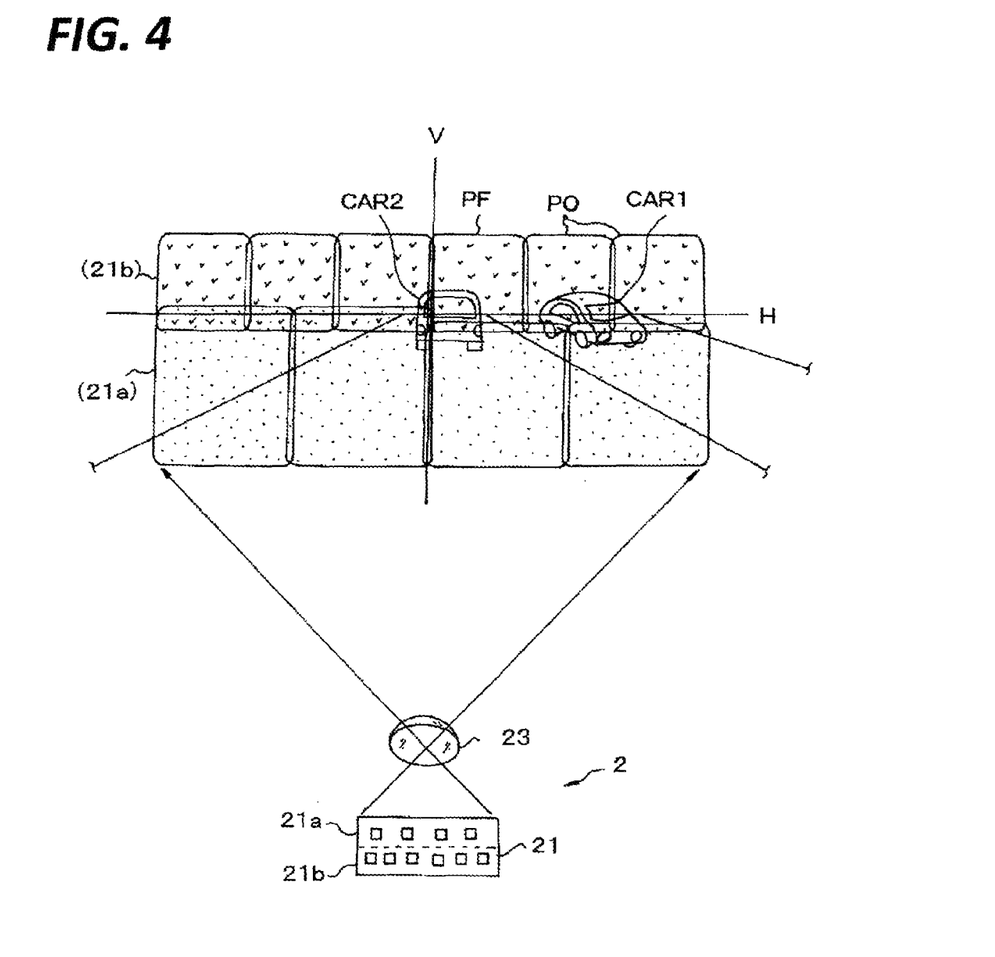
FIG. 4 is a schematic view for explaining the light distribution of the main lamp unit.

As illustrated in FIG. 4, the plurality of white LEDs 21 constituting the light source of the main lamp unit 2 are arranged in two rows of four first row LEDs 21a and six second row LEDs 21b. The illumination region where the light from each white LED 21 (21a, 21b) is projected by the projection lens 23 corresponds to each mesh region in the light distribution pattern at the top of FIG. 4. In the lighting control of the main lamp unit 2 by the main lamp controller 51, when the lighting control unit 512 of the lamp ECU 5 causes the first row LEDs 21a to emit light, the low beam light distribution stippled in FIG. 4 may be obtained. In addition, when the first and second row LEDs 21a and 21b are caused to emit light, a high beam light distribution including the illumination region checked in FIG. 4 is obtained.

In the ADB light distribution control, the other-vehicle detection unit 531 detects other vehicles based on the image captured by the camera 4. When other vehicles are detected, the lighting control unit 512 performs a selective control such that, among all the white LEDs 21 (21a, 21b), white LEDs other than the white LEDs corresponding to the other vehicles emit light. In the example of FIG. 4, for an oncoming vehicle CAR1, the white LED corresponding to region PO is turned off and other white LEDs are caused to emit light. For a preceding vehicle CAR2, the white LED corresponding to region PF is turned off and other white LEDs are caused to emit light. Therefore, it is possible to obtain an ADB light distribution that does not dazzle the other vehicles CAR1, CAR2 and illuminates the front region of the own vehicle as brightly as possible.

As described above, the camera 4 is disposed on the rear side of the extension 13, and the lens barrel 41 is positioned to face the opening window 131 provided in the extension 13, so that the light emitted from the main and sub lamp units 2 and 3 is rarely incident on the lens barrel 41 of the camera 4 directly. Further, since the sub lamp unit 3 is disposed between the camera 4 and the main lamp unit 2, the distance between the main lamp unit 2 and the camera 4 is long. In addition, since the camera 4 is positioned at a position which is shaded by the sub lamp unit 3, the light emitted from the main lamp unit 2 is shielded by the sub lamp unit 3 and is not incident on the camera 4.

Therefore, even when the sub lamp unit 3 is turned on in the case where the main lamp unit 2 is under the high beam light distribution control and the ADB light distribution control, at least the light emitted from the main lamp unit 2 is suppressed from being incident on the camera 4. Thus, it is possible to suppress the occurrence of white-out even when the light emitted from the sub lamp unit 3 is incident on the camera 4.

Here, the extension 13 is disposed in the lamp housing 1, and the camera 4 is disposed on the rear side of the extension 13. However, the same applies to a headlamp which does not have an extension. That is, since the sub lamp unit 3 is disposed between the main lamp unit 2 and the camera 4, the camera 4 may be disposed at a position that is shaded by the sub lamp unit 3 as viewed from the main lamp unit 2. Thus, it is possible to suppress the light emitted from the main lamp unit 2 from being incident on the camera 4.

Meanwhile, some of the light emitted from the main and sub lamp units 2, 3 are reflected by the light-transmitting cover 12, and the reflected light may be incident on the lens barrel 41 of the camera 4. In this case, since the light emitted from the sub lamp unit 3 has a low light amount, white-out hardly occurs even when a part of the emitted light is reflected by the light-transmitting cover 12 and is incident on the camera 4. Further, since the main lamp unit 2 and the camera 4 are disposed at positions separated from each other with the sub lamp unit 4 interposed therebetween, the light emitted from the main lamp unit 2 is reflected by the translucent cover 12 and is incident on the camera 4 at a low light amount, and white-out rarely occurs.

However, when both the lights emitted from the main lamp unit 2 and the light emitted from the sub lamp unit 3 that are reflected by the light-transmitting cover 12 are incident on the camera 4, the light amounts of both the lights are added, so that white-out may occur.

Therefore, in this exemplary embodiment, when the main lamp controller 51 performs the high beam light distribution control and the ADB light distribution control of the main lamp unit 2, the lamp ECU 5 stops the control by the sub lamp controller 52 to forcibly turn off the lamp unit 3. In other words, control is performed such that the sub lamp unit 3 is turned on only when the main lamp unit 2 is in the low beam light distribution state. By turning off the sub lamp unit 3, even when a part of the light emitted from the main lamp unit 2 is reflected by the light-transmitting cover 12 and is incident on the camera 4, it is possible to suppress the occurrence of white-out as described above. Further, when the main lamp unit 2 is in the low beam light distribution, the amount of the light emitted from the main lamp unit 2 is low. Thus, even though both the reflected lights of the main lamp unit 2 and the sub lamp unit 3 are incident on the camera 4, occurrence of white-out is suppressed.

(Second Exemplary Embodiment)

Figure 5:
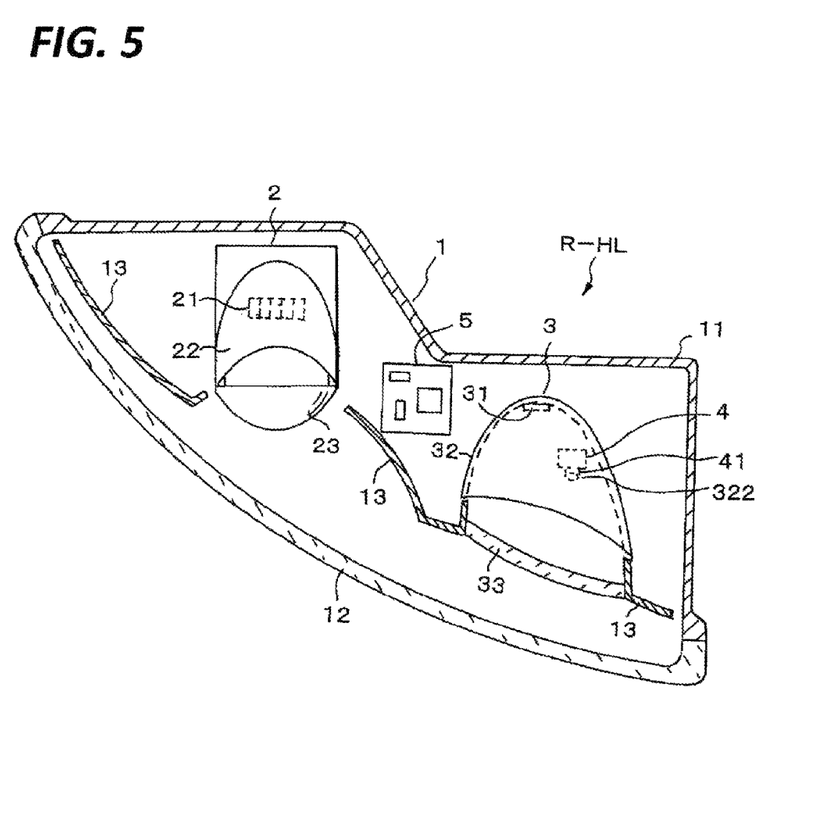
FIG. 5 is a cross-sectional view of a right headlamp of a second exemplary embodiment.

FIG. 5 is a cross-sectional view of a right headlamp according to a second exemplary embodiment of the present disclosure, which corresponds to FIG. 2 of the first exemplary embodiment. The second exemplary embodiment is based on the premise that the sub lamp unit 3 is controlled to be turned off when the high beam light distribution control and the ADB light distribution control are performed in the main lamp unit 2 as described above.

In the second exemplary embodiment, the camera 4 disposed in the lamp housing 1 is configured integrally with the sub lamp unit 3 or is disposed in the vicinity of the sub lamp unit 3. Here, the camera 4 is disposed on the rear side of the reflector 32 of the sub lamp unit 3, and the lens barrel 41 of the camera 4 is disposed in a state of being inserted through an opening window 322 provided in a part of the reflector 32.

Figure 6A:
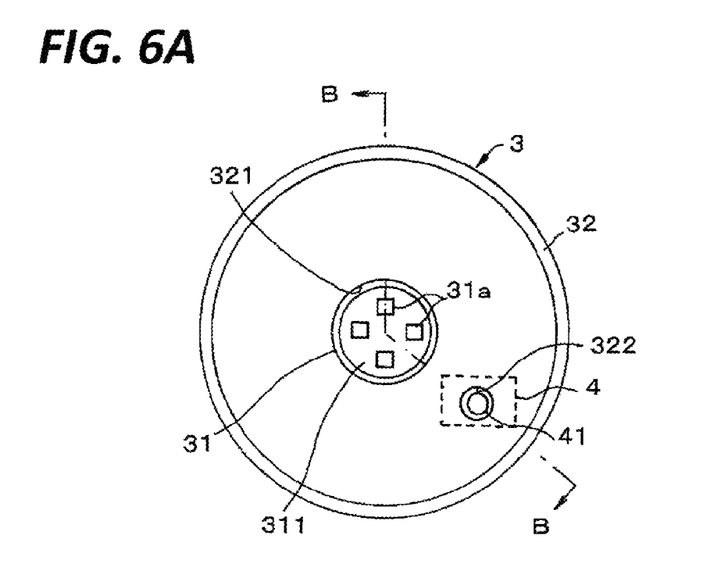
FIG. 6A is a front view illustrating a schematic configuration of a sub lamp unit and a camera.
Figure 6B:
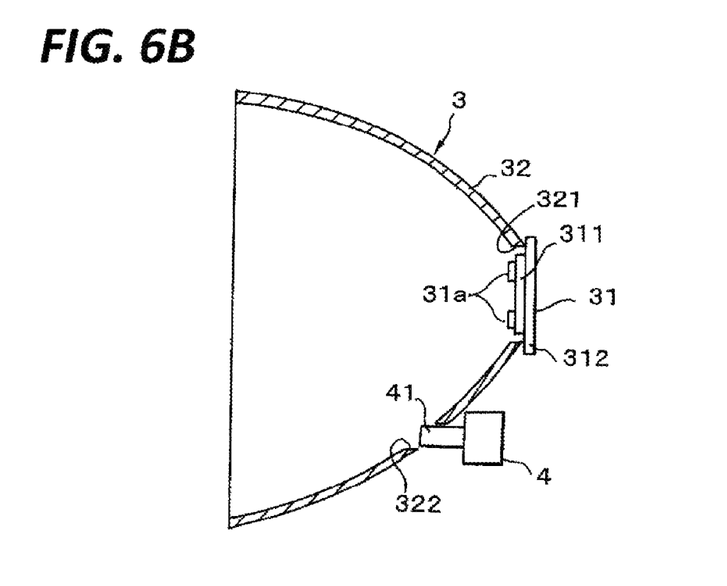
FIG. 6B is a cross-sectional view taken along line B-B.

FIG. 6A is a front view illustrating a schematic configuration of the sub lamp unit 3 and the camera 4, and FIG. 6B is a cross-sectional view taken along line B-B. The sub lamp unit 3 is constituted by the light source 31 and the reflector 32 as described above. A mounting window 321 is opened in the reflector 32, and a light source substrate 311 is attached thereto. A plurality of (in this case, four) white LEDs 31*a* are mounted on the light source substrate 311.

The opening window 322 is opened in a part of the reflector 32 at a position obliquely downwardly rightward of the light source 31 as viewed from the front side of the sub lamp unit 3 such that the camera 4 does not obstruct the light distribution of the sub lamp unit 3, that is, the light distribution as the clearance lamp. The camera 4 is supported by a part of the lamp body 11 or a part of the reflector 32 on the rear side of the reflector 32, and the lens barrel 41 is disposed so as to pass through the opening window 322 from the rear side to the front side of the reflector 32.

According to this configuration, the camera 4 performs image capturing through the opening window 322 of the reflector 32 of the sub lamp unit 3. Since the camera 4 is disposed obliquely below the rear side of the sub lamp unit 3, the camera 4 does not affect the light distribution of the main lamp unit 2. In addition, the camera 4 does not affect the light distribution to the sub lamp unit 3 as well.

Meanwhile, since the sub lamp unit 3 is turned off at the time of image capturing by the camera 4, there is no problem of white-out caused by light emitted from the sub lamp unit 3. Further, since the camera 4 is disposed at a position shaded by the sub lamp unit 3 when viewed from the main lamp unit 2, the light emitted when the main lamp unit 2 is turned on is reflected by the reflector 32 of the sub lamp unit 3. Thus, the emitted light is not incident on the camera 4. Even though the light is incident, the amount is small, so that the occurrence of white-out in the camera 4 may be suppressed.

In the second exemplary embodiment, since the camera 4 is substantially integrated with the sub lamp unit 3, it is unnecessary to provide an independent space for accommodating the camera 4 in the lamp housing 1 as compared with FIG. 2 of the first exemplary embodiment. Further, the dimension in the transverse direction of the headlamp R-HL, that is, the dimension in the vehicle width direction is reduced, and its volume is also reduced, so that a small headlamp may be implemented.

In addition, since the sub lamp unit 3 is turned off at the time of image capturing by the camera 4, the influence of the heat generated by the sub lamp unit 3 on the camera 4 and the captured image is insignificant. In particular, when the ADB light distribution control in the main lamp unit 2 is performed based on the image captured by the camera 4, the influence on the ADB light distribution control due to the heat may be avoided.

Figure 7A:
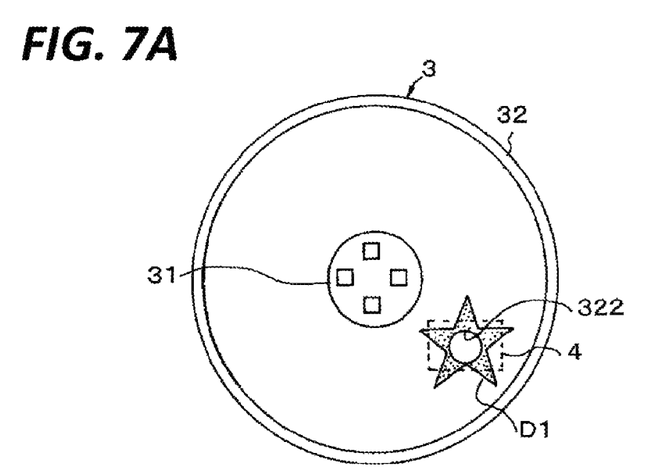
FIGS. 7A and 7B are front views illustrating an example in which the design of the sub lamp unit is improved.
Figure 7B:
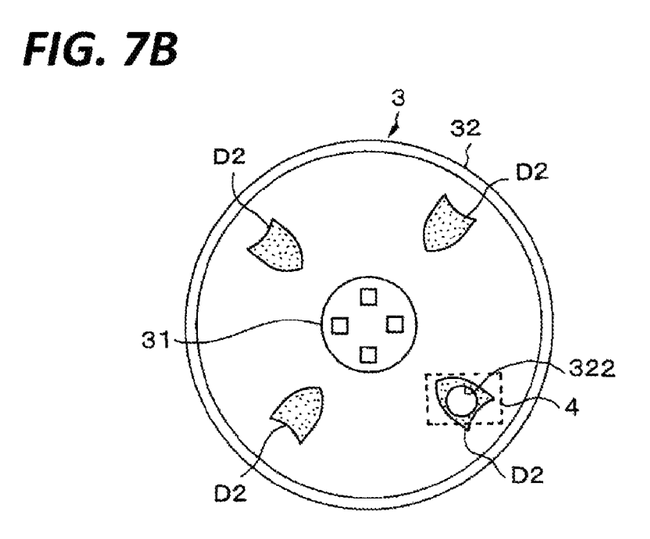

Since the opening window 322 is provided in the reflector 32 of the sub lamp unit 3, there is a concern that the outer appearance of the light-transmitting cover 12 through which the opening window 322 passes may be deteriorated. However, for example, as illustrated in FIG. 7A, the deterioration in the outer appearance may be suppressed by printing a star-like design pattern D1 in the region surrounding the opening window 322 on the front side of the reflector 32, or sticking a seal thereto. Alternatively, as illustrated in FIG. 7B, a petal-like design pattern D2 may be formed in a plurality of regions including the opening window 322. Thus, it is possible to improve the design of the sub lamp unit 3 provided with the opening window 322.

Figure 8A:
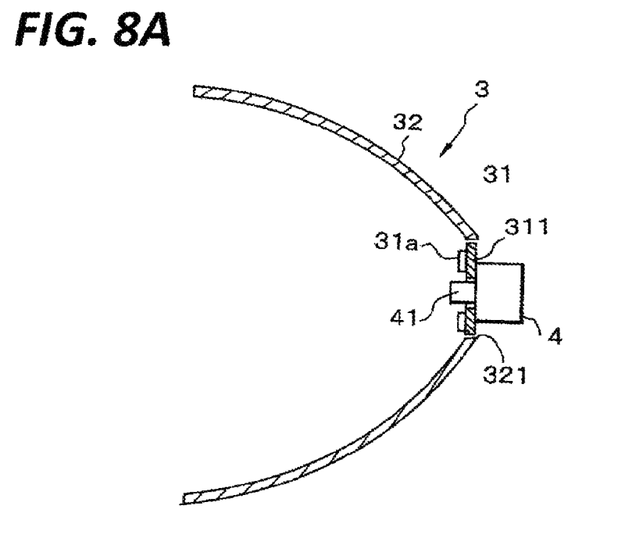
FIGS. 8A and 8B are cross-sectional views of another exemplary embodiment in which a camera is integrated with a light source.
Figure 8B:
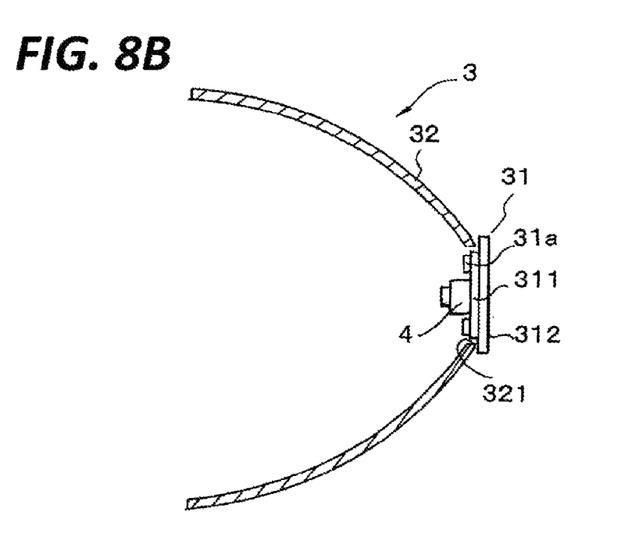

Alternatively, as illustrated in FIGS. 8A and 8B, the camera 4 may be integrated with the light source 31 of the sub lamp unit 3 without forming an opening window in the reflector 32. In FIG. 8A, the camera 4 is attached to the mounting window 321 of the reflector 32. Further, a light source substrate 311 on which the white LEDs 31*a* constituting the light source 31 are mounted is integrally attached to the front surface of the camera 4. The center of the light source substrate 311 is opened, so that the lens barrel 41 of the camera 4 is inserted through the opening, and a plurality of white LEDs 31*a* are disposed around the lens barrel 41. Here, although not illustrated, the light source substrate 311 may be attached to a part of the lens barrel 41 of the camera 4.

Therefore, the camera 4 is disposed in the center of the reflector 32 of the sub lamp unit 3, and a plurality of white LEDs 31*a* are arranged around the lens barrel 41. The sub lamp unit 3 is turned on when each white LED 31*a* emits light, and image capturing is performed by the camera 4 when the sub lamp unit 3 is turned off, so that occurrence of white-out is suppressed.

Alternatively, as illustrated in FIG. 8B, when a small camera module is adopted as the camera, a support substrate 312 may be attached to the mounting window 321 of the sub lamp unit 3 to support the light source substrate 311 on which the white LEDs 31*a* are mounted, and the camera module 4 may be mounted on the light source substrate 311. Also in this configuration, the sub lamp unit 3 is turned on when each white LED 31*a* emits light, and image capturing is performed by the camera 4 when the sub lamp unit 3 is turned off, so that occurrence of white-out is suppressed.

In the above-described exemplary embodiments, the main lamp unit, the sub lamp unit, and the camera are arranged in the horizontal direction, but a part or all of the lamp units and the camera may be arranged in a vertical direction.

In the above-described exemplary embodiments, the main lamp unit is configured to be capable of controlling the high beam distribution, the low beam distribution, and the ADB light distribution, but the high beam lamp unit and the low beam lamp unit may be configured as independent lamp units, so that the ADB light distribution control may be performed in either one of the high beam lamp unit and the low beam lamp unit.

The present disclosure is not limited to a headlamp, but may be applied to any illumination lamp having a configuration that controls the lighting state, particularly, the light distribution upon illumination based on the image captured by the camera. Here, the main lamp unit may be any lamp unit having a configuration in which the light distribution is controlled based on an image captured by an image capturing unit. The sub lamp unit is not limited to a clearance lamp, but may be any other lamp. That is, in the case of the first exemplary embodiment, the sub lamp unit may be any auxiliary lamp or marker lamp (e.g., a fog lamp and a cornering lamp) in which the amount of emitted light is smaller than that of the main lamp unit. In the case of the second exemplary embodiment, the sub lamp unit may be any auxiliary lamp or indicator lamp which is capable of being turned off at the time of the light distribution control by the main lamp unit.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a lamp housing accommodating a main lamp unit, a sub lamp unit, and an imaging unit, and configured to perform a light distribution control of the main lamp unit based on an image captured by the imaging unit; and an extension disposed in the lamp housing for partitioning the lamp housing, wherein the sub lamp unit is disposed between the imaging unit and the main lamp unit, and the imaging unit is provided so as to face an opening window provided in a portion of the extension.

2. The vehicular lamp of claim 1, wherein the main lamp unit is capable of being subjected to at least an adaptive driving beam (ADB) light distribution control, and the sub lamp unit is an auxiliary lamp or an indicator lamp including a clearance lamp.

3. The vehicular lamp of claim 1, wherein the imaging unit includes a camera having a lens barrel.

4. The vehicular lamp of claim 3, wherein the imaging unit is disposed on a rear side of the extension, such that light emitted from the main lamp unit and the sub lamp unit is rarely directly incident on the lens barrel of the camera.

5. A vehicular lamp comprising:
a lamp housing accommodating a main lamp unit, a sub lamp unit, and an imaging unit, and configured to perform a light distribution control of the main lamp unit based on an image captured by the imaging unit,
wherein the sub lamp unit is turned off when the main lamp unit is subjected to a light distribution control, and the imaging unit is formed integrally with the sub lamp unit and provided so as to face an opening window provided in a portion of the sub lamp unit.

6. The vehicular lamp of claim 5, wherein the opening window is provided in a reflector of the sub lamp unit, and a region including the opening window is decorated with a design.

7. The vehicular lamp of claim 5, wherein the imaging unit is formed integrally with a light source of the sub lamp unit.

8. The vehicular lamp of claim 5, wherein the main lamp unit is capable of being subjected to at least an adaptive driving beam (ADB) light distribution control, and the sub lamp unit is an auxiliary lamp or an indicator lamp including a clearance lamp.

9. The vehicular lamp of claim 6, wherein the main lamp unit is capable of being subjected to at least an adaptive driving beam (ADB) light distribution control, and the sub lamp unit is an auxiliary lamp or an indicator lamp including a clearance lamp.

10. The vehicular lamp of claim 7, wherein the main lamp unit is capable of being subjected to at least an adaptive driving beam (ADB) light distribution control, and the sub lamp unit is an auxiliary lamp or an indicator lamp including a clearance lamp.

11. The vehicular lamp of claim 5, wherein the imaging unit includes a camera having a lens barrel.

12. The vehicular lamp of claim 7, wherein the imaging unit includes a camera having a lens barrel.

13. The vehicular lamp of claim 12, wherein the light source of the sub lamp unit includes a light source substrate, the light source substrate integrally attached to a front surface of the camera.

14. The vehicular lamp of claim 13, wherein a center of the light source substrate is open and the lens barrel of the camera is configured to be inserted therethrough.

15. The vehicular lamp of claim 7, wherein the light source of the sub lamp unit includes a light source substrate, the imaging unit mounted to a front surface of the light source substrate.

* * * * *